United States Patent
Drake et al.

(10) Patent No.: US 6,243,798 B1
(45) Date of Patent: *Jun. 5, 2001

(54) COMPUTER SYSTEM FOR ALLOWING A TWO WORD JUMP INSTRUCTION TO BE EXECUTED IN THE SAME NUMBER OF CYCLES AS A SINGLE WORD JUMP INSTRUCTION

(75) Inventors: Rodney J. Drake; Randy L. Yach; Joseph W. Triece, all of Phoenix; Jennifer Chiao, Chandler; Igor Wojewoda, Phoenix; Steve Allen, Chandler, all of AZ (US)

(73) Assignee: Microchip Technology Incorporated, Chandler, AZ (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/958,940

(22) Filed: Oct. 28, 1997

(51) Int. Cl.[7] .............................. G06F 12/02; G06F 9/42
(52) U.S. Cl. .......................... 711/211; 711/214; 712/205
(58) Field of Search .............................. 712/24, 206, 215, 712/205; 711/211, 214, 220

(56) References Cited

U.S. PATENT DOCUMENTS

| | | | |
|---|---|---|---|
| 3,969,723 | * 7/1976 | Kennicott | 700/83 |
| 3,976,976 | 8/1976 | Khosharian | 711/2 |
| 4,240,139 | 12/1980 | Fukuda et al. | 711/215 |
| 4,363,091 | 12/1982 | Pohlman, III et al. | 711/2 |
| 4,479,178 | 10/1984 | Schabowski | 710/129 |
| 5,203,002 | * 4/1993 | Wetzel | 712/21 |
| 5,430,864 | * 7/1995 | Powell et al. | 710/66 |
| 5,453,927 | 9/1995 | Matsuo | 712/235 |
| 5,560,039 | * 9/1996 | Dulong | 712/24 |
| 5,566,308 | 10/1996 | Bendelac et al. | 711/2 |
| 5,673,410 | * 9/1997 | Kurisu | 712/210 |
| 5,809,327 | * 9/1998 | Wollan et al. | 712/33 |
| 5,835,746 | * 10/1998 | Girardeau, Jr. et al. | 712/215 |

FOREIGN PATENT DOCUMENTS

| | | |
|---|---|---|
| 0 020 908 | 1/1981 | (EP) . |
| 0 362 819 | 4/1990 | (EP) . |
| 0 706 120 | 4/1996 | (EP) . |
| WO 95/28677 | 10/1995 | (WO) . |
| WO 97/32249 | 4/1997 | (WO) . |

* cited by examiner

*Primary Examiner*—Do Yoo
*Assistant Examiner*—Gary J. Portka
(74) *Attorney, Agent, or Firm*—Baker Botts L.L.P.

(57) ABSTRACT

A system for allowing a two word jump instruction to be executed in the same number of cycles as a single word jump instruction, thereby allowing a processor system to increase memory space without reducing performance. A first address bus is coupled to the linearized program memory for sending addresses of instructions to be fetched to a linearized program memory. A pointer is coupled to the first address bus for storing an address location of a current instruction in the linearized program memory to be fetched and for placing the address location of the current instruction to be fetched on the first address bus. A second address bus is provided and has one end coupled to the output of the program memory and a second end coupled to the first address bus. The second address bus is used for placing an address of an operand of a second word of the two word jump instruction onto the first address bus after an address of an operand of a first word of the two word jump instruction has been placed on the first address bus. This allows the addresses of the first word and the second word to be combined to provide the full address value of the two word jump instruction in the same number of cycles as a single word jump instruction.

13 Claims, 1 Drawing Sheet

COMPUTER SYSTEM FOR ALLOWING A TWO WORD JUMP INSTRUCTION TO BE EXECUTED IN THE SAME NUMBER OF CYCLES AS A SINGLE WORD JUMP INSTRUCTION

BACKGROUND OF THE INVENTION

1. Field of the Invention

This invention relates generally to processors, and more specifically, to a system and method for allowing a two word "jump" instruction to be executed in the same number of cycles as a single word "jump" instruction, thereby allowing a processor system to increase addressable memory space without reducing performance.

2. Background of the Invention

Presently, in some processor systems, all instructions are single word instructions. This means that a single word is used to inform the processor of each specific operation to be performed. A problem with single word instructions is that they limit the amount of addressable memory space since single word instructions only have a limited number of address bits.

In order to increase the addressable memory space, some processor systems implement a paging scheme in the program memory. In a paging scheme, the program memory is divided into a plurality of pages. A bit or bits in a data file location will indicate which page in the program memory is currently being accessed. The problem with paging schemes is that in order to access data in a different page (i.e., a page different from the currently selected page) the bit or bits in the data file location need to be changed. This creates a lot of problems for the end user especially if a programmer did not properly change the data file bit(s) when required.

Therefore, a need exists to provide a system for increasing the addressable memory space to be used by a processor. The system must increase the addressable memory space to be used by the processor without reducing the overall performance of the processor. The system must increase the addressable memory space without using a paging scheme and without reducing the overall performance of the processor. The system must increase the addressable memory space without reducing the overall performance of the processor by allowing two word jump instructions to be executed in the same number of cycles as a single jump instruction.

SUMMARY OF THE INVENTION

In accordance with one embodiment of the present invention, it is an object of the present invention to provide a system for increasing the addressable memory space to be used by a processor.

It is another object of the present invention to provide a system for increasing the addressable memory space to be used by the processor without reducing the overall performance of the processor.

It is still another object of the present invention to provide a system that increases addressable memory space without using a paging scheme and without reducing the overall performance of the processor.

It is still another object of the present invention to provide a system that increases the addressable memory space to be used by a processor without reducing the overall performance of the processor by allowing two word jump instructions to be executed in the same number of cycles as a single word jump instruction.

BRIEF DESCRIPTION OF THE PREFERRED EMBODIMENTS

In accordance with one embodiment of the present invention, a system for allowing a two word jump instruction to be executed in the same number of cycles as a single word jump instruction thereby allowing a processor system to increase memory space without reducing performance is disclosed. The system utilizes a linearized program memory for storing instructions to be executed by the processor system. A first address bus is coupled to the linearized program memory for sending addresses of instructions to be executed by the processor system to the linearized program memory. A pointer is coupled to the first address bus for storing an address location of a current instruction in the linearized program memory to be fetched and for placing the address location of the current instruction to be fetched on the first address bus. A second address bus is provided and has one end coupled to an output of the program memory and a second end coupled to the first address bus. The second address bus is used for placing an address of an operand of a second word of the two word jump instruction on the first address bus after an address of an operand of a first word of the two word jump instruction has been placed on the first address bus. This allows for a full address value of the two word jump instruction to be sent to the linearized program memory in the same number of cycles as a single word jump instruction.

In accordance with another embodiment of the present invention, a method is disclosed which allows for a two word jump instruction to be executed in the same number of cycles as a single word ump instruction, thereby allowing a processor system to increase memory space without reducing performance. The method comprises the steps of providing a linearized program memory for storing instructions to be executed by the processor system; providing a first address bus coupled to the linearized program memory for sending the addresses of the instructions to be executed by the system to the linearized program memory; providing a pointer coupled to the first address bus for storing an address location of a current instruction in the linearized program memory to be fetched and for placing the address location of a current instruction in the linearized program memory to be fetched on the first address bus; and providing a second address bus having one end coupled to an output of the program memory and a second end coupled to the first address bus for placing an address of an operand of a second word of the two word jump instruction on the first address bus after a address of an operand of a first word of the two word jump instruction has been placed on the first address bus thereby providing a full address value of the two word jump instruction in the same number of cycles as a single word jump instruction to the linearized program memory.

The foregoing and other objects, features, and advantages of the invention will be apparent from the following, more particular, description of the preferred embodiments of the invention, as illustrated in the accompanying drawing.

DETAILED DESCRIPTION OF THE PREFERRED EMBODIMENTS

Figure 1:
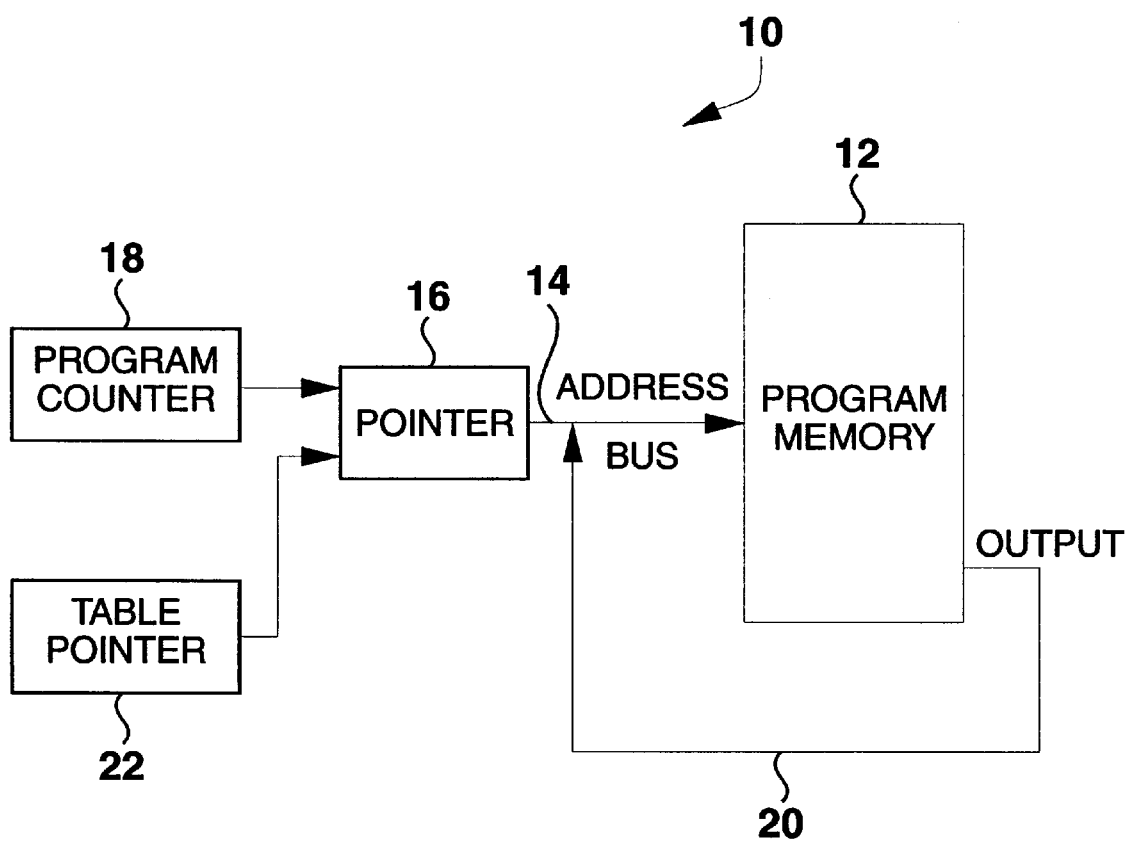
FIG. 1 shows a simplified functional block diagram of a system for allowing a two word jump instruction to be executed in the same number of cycles as a single word jump instruction.

Referring to FIG. 1, in order to eliminate a paging scheme in the program memory and further increase addressable address space in the program memory 12, all program jumps (program jumps are where paging becomes an important issue since a jump is from one location to another) to be increased from a single word jump instruction to a two word jump instruction. By providing two word jump instructions, the size of the program memory 12 may be increased. This is due to the fact that a two word jump instruction will be able to access a larger address space due to the increased size of the instruction. Thus, the two word jump instruction will allow the entire address base of the extended program memory 12 to be fully defined. In the preferred embodiment of the present invention, each word of the two word jump instruction is 16 bits in length. The first word will use eight bits to encode the "op-code" and the other eight bits to address memory locations within the program memory 12. The second word or operand requires only four bits to distinguish it as an operand and the other 12 bits can be used as an address.

The problem with a two word instruction is that it will not execute as fast as a single word instruction. Since an instruction is being fetched while another instruction is being executed, a single word "jump" instruction generally takes two cycles to "flush out" the pipeline and execute. If the instruction to be executed is a single word "jump" instruction, the instruction that was fetched is no longer real (i.e., not the next instruction to be executed). A no operation (NOP) needs to be performed and the instruction to be "jumped" to needs to be fetched. The instruction that was pointed to by the "jump" may then be executed. For a two word "jump" instruction, three cycles would be required to load the two word jump instruction, flush out the pipeline and to execute. This would reduce the overall performance of the processor system since at least one additional cycle is required to perform a "jump" instruction.

System 10 was designed for allowing a two word jump instruction to be executed in the same number of cycles as a single word jump instruction, thereby allowing a processor system to increase memory space without reducing the overall performance of the processor system. The system 10 utilizes a program memory 12. The program memory 12 is used for storing instructions to be executed by a processor system. The program memory 12 is not divided into a plurality of pages. Instead, the entire address range of the program memory 12 is linearized. In the preferred embodiment of the present invention, the program memory 12 is a 1 megaword (where 1 word is equal to 16 bits) linearized program memory 12.

A first address bus 14 is coupled to the linearized program memory 12. The first address bus 14 is used for sending the addresses of instructions to be fetched to the linearized program memory 12. A pointer 16 is coupled to the first address bus 14. The pointer 16 is used for storing an address location of the current instruction in the linearized program memory 12 to be fetched. The pointer 16 then places the address location of the current instruction to be fetched onto the first address bus 14 to indicate the address of the instruction in the linearized program memory 12 to be fetched. A program counter 18 is generally coupled to the pointer 16 for loading the pointer 16 with the address location of the current instruction in the linearized program memory 12 to be fetched.

A second address bus 20 has a first end coupled to the output of the linearized program memory 12. The output of the linearized program memory is the value of the instruction that is being fetched. The second end of the second address bus 20 is coupled to the first address bus 14. The second address bus 20 is used for placing an address of an operand of the second word of the two word jump instruction (the one being fetched when the first word is being executed) on the first address bus 14 after the address of the operand of the first word of the two word jump instruction has been placed on the first address bus 14. As stated above, in a normal system for a two word jump instruction, three cycles are required. However, the system 10 allows the addresses of the first word and the second word to be combined to provide the full address value of the two word instruction. Thus, during the second cycle of the "jump" instruction, the actual "jump" instruction may be fetched. The system 10 therefor allows one to expand the program memory without having to use any memory paging scheme. The expansion of the program memory further does not decrease the system performance since a two word "jump" instruction will take the same number of cycles as a single word "jump" instruction.

The system 10 may further have a table pointer 22. The table pointer 22 is coupled to the pointer 16. The table pointer is used for allowing table reads and table writes to and from the linearized program memory 12.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A computer system comprising, in combination:
   a linearized program memory for storing instructions to be executed by a processor system;
   a first address bus coupled to said program memory for sending said address of said instructions to be fetched to said program memory;
   a pointer coupled to said first address bus for storing a first address location of a first word of a two word jump instruction in said program memory to be fetched and for placing said first address location of said jump instruction in said program memory to be fetched on said first address bus; and
   a second address bus having one end coupled to an output of said program memory and a second end coupled to said first address bus for placing a second address of an operand of a second word of said two word jump instruction on said first address bus after an address of an operand of said first word of said two word jump instruction has been placed on said first address bus thereby providing a full address value of said two word jump instruction to said program memory;
   wherein said two word jump instruction is enabled to be executed in the same number of cycles as a single word jump instruction.

2. A computer system in accordance with claim 1 further comprising a program counter coupled to said pointer for loading said pointer with said address location of said first word of said two word jump instruction in said program memory to be fetched.

3. A computer system in accordance with claim 1 further comprising a table pointer coupled to said pointer for allowing table reads and table writes to and from said program memory.

4. A computer system in accordance with claim 1 wherein said first word and said second word of said two word jump instruction are both 16 bit instructions.

5. A computer system in accordance with claim 1 wherein said program memory is a one megaword (where one word is equal to 16 bits) program memory.

6. A computer system comprising, in combination:

a linearized program memory for storing instructions to be executed by a processor system;

a first address bus coupled to said program memory for sending said addresses of said instructions to be fetched to said program memory;

a pointer coupled to said first address bus for storing a first address location of a first word of a two word instruction in said linearized program memory to be fetched and for placing said first address location of said lump instruction in said program memory to be fetched on said first address bus;

a program counter coupled to said pointer for loading said pointer with said address location of said current instruction in said program memory to be fetched on said first address bus;

a second address bus having one end coupled to an output of said program memory and a second end coupled to said first address bus for placing a second address of an operand of a second word of said two word jump instruction on said first address bus after an address of an operand of a said first word of said two word jump instruction has been placed on said first address bus thereby providing a full address value of said two word jump instruction to said program memory; and a table pointer coupled to said pointer for allowing table reads and table writes to and from said program memory;

wherein said two word jump instruction is enabled to be executed in the same number of cycles as a single word jump instruction.

7. A computer system in accordance with claim 6 wherein said first word and said second word of said two word jump instruction are both 16 bit instructions.

8. A computer system in accordance with claim 6 wherein said program memory is a one megaword (where one word is equal to 16 bits) program memory.

9. A computer system comprising, in combination:

providing a linearized program memory for storing instructions to be executed by a processor system;

providing a first address bus coupled to said program memory for sending said addresses of said instructions to be fetched to said program memory;

providing a pointer coupled to said first address bus for storing a first address location of a first word of a two word jump instruction in said program memory to be fetched and for placing said first address location of said first instruction in said program memory to be fetched on said first address bus; and providing a second address bus having one end coupled to an output of said program memory and a second end coupled to said first address bus for placing a second address of an operand of a second word of said of said two word jump instruction on said first address bus after an address of an operand of said first word of said two word jump instruction has been placed on said first address bus thereby providing a full address value of said two word jump instruction to said program memory so that said two word jump instruction can be executed in the same number of cycles as a single word jump instruction.

10. The method of claim 9 further comprising the step of providing a program counter coupled to said pointer for loading said pointer with said first address location of said two word jump instruction in said program memory to be fetched.

11. The method of claim 9 further comprising the step of providing a table pointer coupled to said pointer for allowing table reads and table writes to and from said program memory.

12. The method of claim 9 wherein said first word and said second word of said two word jump instruction are both 16 bit instructions.

13. The method of claim 9 further comprising the step of providing a program memory which is a one megaword (where one word is equal to 16 bits) program memory.

* * * * *